(12) United States Patent
Mozaffari et al.

(10) Patent No.: US 12,395,335 B2
(45) Date of Patent: Aug. 19, 2025

(54) FEDERATED LEARNING BY PARAMETER PERMUTATION

(71) Applicant: Oracle International Corporation, Redwood City, CA (US)

(72) Inventors: Hamid Mozaffari, Amherst, MA (US); Virendra J. Marathe, Florence, MA (US); David Dice, Foxboro, MA (US)

(73) Assignee: Oracle International Corporation, Redwood City, CA (US)

( * ) Notice: Subject to any disclaimer, the term of this patent is extended or adjusted under 35 U.S.C. 154(b) by 196 days.

(21) Appl. No.: 18/366,586

(22) Filed: Aug. 7, 2023

(65) Prior Publication Data

US 2024/0064016 A1 Feb. 22, 2024

Related U.S. Application Data

(60) Provisional application No. 63/371,379, filed on Aug. 12, 2022.

(51) Int. Cl.
*G06N 20/00* (2019.01)
*H04L 9/14* (2006.01)
*H04L 9/30* (2006.01)

(52) U.S. Cl.
CPC .............. *H04L 9/30* (2013.01); *G06N 20/00* (2019.01); *H04L 9/14* (2013.01)

(58) Field of Classification Search
None
See application file for complete search history.

(56) References Cited

U.S. PATENT DOCUMENTS

2013/0173917 A1\* 7/2013 Clifton .................. G06F 16/334
713/167

OTHER PUBLICATIONS

Zhu, L.; et al., "Deep leakage from gradients," In Advances in Neural Information Processing Systems, pp. 14747-14756, 2019.
Aguilar-Melchor, C., et al. "XPIR: Private Information Retrieval for Everyone," Proceedings on Privacy Enhancing Technologies, 2016, pp. 155-174.
Angel, S.; et al., "PIR with Compressed Queries and Amortized Query Processing," In 2018 IEEE Symposium on Security and Privacy (SP), pp. 962-979, IEEE, 2018.
Bagdasaryan, E; et al., How to Backdoor Federated Learning, In Proceedings of the 23rd International Conference on Artificial Intelligence and Statistics (AISTATS), 2020, pp. 1-10.
Baloer, V.; et al., "Separating Local & Shuffled Differential Privacy via Histograms," arXiv preprint arXiv.1911.06879, 2019, pp. 1-14.

(Continued)

*Primary Examiner* — Cai Y Chen
(74) *Attorney, Agent, or Firm* — S. Scott Foster; Kowert, Hood, Munyon, Rankin & Goetzel, P.C.

(57) ABSTRACT

Parameter permutation is performed for federated learning to train a machine learning model. Parameter permutation is performed by client systems of a federated machine learning system on updated parameters of a machine learning model that have been updated as part of training using local training data. An intra-model shuffling technique is performed at the client systems according to a shuffling pattern. Then, the encoded parameters are provided to an aggregation server using Private Information Retrieval (PIR) queries generated according to the shuffling pattern.

20 Claims, 10 Drawing Sheets

(56) References Cited

OTHER PUBLICATIONS

Balle, B; et al., "Differentially Private Summation with Multi-Message Shuffling," arXiv preprint arXiv.1906.09116, 2019, pp. 1-9.
Balle, B.; et al., "The Privacy Blanket of the Shuffle Model," In Annual International Cyptology Conference, pp. 638-667, Advances in Cryptology—Crypto 2019: 39th Annual International Cryptology Conference, Springer 2019 (retrieved from arXiv:1903.02837v2).
Baruch, M.; et al., "A Little Is Enough: Circumventing Defenses For Distributed Learning," In NeurIPS, 2019, 33rd Conference on Neural Information Processing Systems pp. 1-11.
Bell, J.H.; et al., "Seure Single-Server Aggregation with(poly) Logarithmic Overhead," In Proceedings of the 2020 ACM SIGSAC Conference on Computer and Communications Security, pp. 1253-1269, 2020.
Bonawitz, K.; et al., "Practival Secure Aggregation for Privacy Preserving Machine Learning," In Proceedings of the 2017 ACM SIGSAC Conference on Computer and Communications Security, pp. 1175-1191, ACM, 2017.
Brendan, M. H.; et al., "Learning Differentially Private Recurrent Language Models," International Conference on Learning and Representation, Published as a conference paper at ICLR 2018, (retrieved from arXiv:1710.06963v3), pp. 1-14.
Chang, Y.C., "Single database private information retrieval with logarithmic communication," In Australasian Conference on Information Sercurity and Privacy, pp. 50-61, 9th Australasian Conference, ACISP 2004, Springer.
Chor, B.; et al., "Computationally private information on retrieval," In Proceedings of the twenty-ninth annual ACM symposium on theory of computer, pp. 304-313, ACM, 1997.
Damgard, I.; et al., "A Generalisation, a Simplification and Some Applications of Paillier's Probabilistic Public-Key System," In International workshop on public key cryptography, pp. 119-136, Springer 2001.
Duchi, J.C.; et al., "Local Privacy and Statistical Minimax Rates," 2013 IEEE 54th Annual Symposium on Foundations of Computer Science, pp. 1-10.
Dwork, C.; et al., "The algoirthmic foundations of differential privacy," Foundations and Trends(R) in Teoretical Computer Science, vol. 9: No. 3-4, pp. 211-407. http://dx.doi.org/10.1561/0400000042, 2014.
Dwork, C.; et al., "boosting and differential privacy," In 2010 IEEE 51st Annual Symposium on Foundations of Computer Science, pp. 51-60, IEEE, 2010.
Erlingsson U.; et al., "Amplification by Shuffling: From Local to Central Differential Privacy via Anonymity," In Proceedings of the Thirtieth Annual ACM-SIAM Symposium on Discrete Algorithms, pp. 2468-2479, SIAM, 2019.
"Fang, M.; et al., ""Local Model Poisoning Attacks to Byzantine-Robust Federated Learning,"" This paper is included in the Proceedings of the 29th USENIX Security Symposium, 2020, pp. 1625-1640.".
Fereidooni, H.; et al., "SAFELearn: secure aggregation for private federated learning," In 2021 IEEE Security and Privacy Workshops (SPW), pp. 56-62, IEEE, 2021.
Greyer, R.C.; et al., "Differentially private federated learning: A Client level perspective," arXiv preprint arXiv :1712.07557, 2017, pp. 1-7.
Ghazi, B.; et al., "Scalable and differentially private distributed aggregation in the shuffled model," arXiv preprint arXiv:1906.08320, 2019, pp. 1-18.
Girgis, A.; et al., "Shuffled Model of Differential Privacy in federated learning," In International Conference on Artificial Intelligence and Statistics, pp. 2521-2529, PMLR, 2021.
Kairouz, P.; et al., "Advances and open problems in federated learning," arXiv preprint arXiv:1912.04977v3, 2021, pp. 1-121.
Kasiviswanathan, S.P.; et al., "What Can We Learn Privately?" Corr, abs/0803.0924, 2008, pp. 1-31.

Konecny, J.; et al., "Federated learning: Strategies for improving communication efficiency," arXiv preprint arXiv:1610.05492, 2017, pp. 1-10.
Lim, J.Q.; et al., "From Gradient Leakage To Adversarial Attacks in Federated Learning," In IEEE International Conference on Image Processing (ICIP), pp. 3602-3606, 2021.
Liu, R.; et al., "Fedsel: Federated sgd under local differential privace with top-k dimension selection," In International Conference on Database Systems for Advanced Applications, pp. 485-501, Springer 2020.
McMahan, H.B.; et al, "Communication-efficient learning of deep networks from decentralized data," AISTATS, pp. 1273-1282, 2017.
Mhamdi, E.M.E., "The Hidden Vulnerability of Distributed Learning in Byzantium," In ICML, pp. 3521-3530, 2018.
Mosaffari, H.; et al, "Heterogeneous Private Information Retrieval," In NDSS, 2020, pp. 1-18.
Mosaffari, H.; et al., "FSL: Federated Supermask Learning," arXiv preprint arXiv:2110.04350, 2021, pp. 1-18.
Naseri, M.; et al., "Local and central differential privacy for robustness and privacy in federated learning," arXiv preprint arXiv:2009.03561v5, 2022, pp. 1-20.
Nasr, M.; et al., "Comprehensive Privacy Analysis of Deep Learning: Stand-alone and Federated Learning under Passive and Active White-box Inference Attacks," Security and Privacy (SP), 2019 IEEE Symposium, pp. 1-15.
Nguyen, T.D.; et al., "FLAME: Taming Backdoors in Federated Learning," Cyptology ePrint Archive, 2021, pp. 1-18.
Paillier, P., "Public-Key Cryptosystems Based on Composite Degree Residuosity Classes," In International conference on the theory and applications of cryptographic techniques, pp. 223-238, Springer 1999.
Shejwalkar, V.; et al., "Manipulating the Byzantine: Optimizing Model Poisoning Attacks and Defenses for Federated Learning," In NDSS, 2021, pp. 1-19.
Shejwalkar, V.; et al., "Back to the Drawing Board: A Critical Evaluation of Poisoning Attacks on Federated Learning," In Security and Privacy (SP), 2021, pp. 1-19 . . . .
Stern, J.P., "A new and efficient all-or-nothing disclosure of secrets protocol," In International Conference on the Theory and Application of Cryptology and Information Security, pp. 357-371, Springer 1998.
Sun, Z.; et al., "Can you really backdoor federated learning?," In NeurIPS FL Workshop, 2019, retrieved from arXiv:1911.07963v2, pp. 1-10.
Truex, S.; et al., "A hybrid approach to privacy-preserving federated learning," In Proceedings of the 12th ACM workshop on artificial intelligence and security, retrieved from arXiv:1812.03224v2, pp. 1-11, 2019.
Truex, S.; et al., "LDP-Fed: Federated Learning with Local Differential Privacy," In Proeedings of the 3rd International Workshop on Edge Systems, Analytics and Networking, EdgeSys Eruro Sys 2020, Heraklion, Greece Apr. 27, 2020, pp. 61-66, ACM, retrieved from arXiv:2006.03637v1.
Wang, H.; et al., "Attack of the tails: Yes, you really can backdoor federated learning," 34th Conference on NeurIPS, 2020, pp. 1-15.
Wang, N.; et al., "Collecting and analyzing multi-dimensional data with local differential privacy," In 2019 IEEE 35th International Conference on Data Engineering (ICDE), pp. 638-649, IEEE, 2019.
Warner, S.L., "Randomized response: A survey technique for elimination evasive answer bias," Journal of the American Statistical Association, 60(309), pp. 63-69, 1965.
Wei, W.; et al., "A Framework for Evaluating Gradient Leakage Attacks in Federated Learning," CoRR, abs/2004.10397, 2020, retrieved from arXiv:2004.10397v2, pp. 1-25.
Kie, C.; et al., "Dba: Distributed backdoor attacks against federated learning," In ICLR, 2019, pp. 1-15.
Xu, R.; et al., "Hybridalpha: An efficient approach for privacy preserving federated learning," In Proceedings of the 12th ACM Workshop on Artificial Intelligence and Security pp. 13-23, retreived from arXiv:1912.05897v1, 2019.
Ying, D.; et al., "Bysantine-Robust Distributed Learning: Towards Optimal Statistical Rates," Proceedings of the 35th International Conference on Machine Learning, PMLR 80:5650-5659, 2018.

(56) References Cited

OTHER PUBLICATIONS

Zhang, C.; et al., "{BatchCrypt}: Efficient homomorphic encryption for {Cross-Silo} federated learning" In 2020 USENIX annual technical conference USENIX ATC 20) pp. 493-506, 2020.

* cited by examiner $$\theta = \begin{bmatrix} \theta_A \\ \theta_B \\ \theta_C \end{bmatrix} = \begin{bmatrix} \theta_1 & \theta_4 & \theta_7 & \theta_{10} \\ \theta_2 & \theta_5 & \theta_8 & \theta_{11} \\ \theta_3 & \theta_6 & \theta_9 & \theta_{12} \end{bmatrix} \text{ where } \pi = \begin{bmatrix} 3 \\ 1 \\ 2 \end{bmatrix}$$

π shuffling window 202a, 202b, 202c, 202d, 202e

*FIG. 2*

Input: number of Federated Learning (FL) rounds $T$, number of local epochs $E$, number of selected users in each round $n$, learning rate $\eta$, local privacy budget $\varepsilon_d$, number of model parameters $d$, parameter update clipping threshold $C$ Output: $\theta_g^T$ 1:     $\theta_g^T \leftarrow$ Initialize weights     *(executed by server)*
2:     for each iteration $t \in [T]$ do
3:         $U \leftarrow$ set of $n$ randomly select clients out of $N$ total clients     *(executed by server)*
4:         for $u$ in $U$ do
5:             $\theta_u^t \leftarrow \text{LOCALUPDATE}(\theta_g^t, \eta, E)$
6:             $\bar{\theta}_u^t \leftarrow \text{CLIP}(\theta_u^t, -C, C)$
7:             $\tilde{\theta}_u^t \leftarrow (\bar{\theta}_u^t + C)/(2C)$
8:             $y_u^t \leftarrow \text{RANDOMIZE}(\tilde{\theta}_u^t, \varepsilon_d)$
9:             $\pi_u \leftarrow$ Shuffling pattern RANDOMPERMUTATIONS $\in [1, d]$
10:           $\tilde{y}_u^t \leftarrow \text{SHUFFLE}(y_u^t, \pi_u)$
11:           $b_u^t \leftarrow \text{BINARYMASK}(\pi_u)$
12:           $c_u^t \leftarrow \text{ENC}_{pk}(b_u^t)$
13:           Client $u$ sends $(\tilde{y}_u^t, c_u^t)$ to the server

*(lines 4–13 executed by client)*

14:         end for
15:         norm bounding: $\tilde{y}_u^t, \pi_u \cdot \min(1, \frac{M}{\|\tilde{y}_u^t\|_2})$ for $u \in U$
16:         $\bar{z} \leftarrow \frac{1}{n}\sum_{u \in U}(c_u^t \times \tilde{y}_u^t)$     *(executed by server)*
17:         $z \leftarrow \text{DEC}_{sk}(\bar{z})$
18:         normalize $z \leftarrow C \cdot (2z - 1)$
19:         update model $\theta_g^{t+1} \leftarrow \theta_g^t + z$

*(lines 17–19 executed by client)*

20:     end for
21: return $\theta_g^T$

FIG. 4

FEDERATED LEARNING BY PARAMETER PERMUTATION

RELATED APPLICATIONS

This application claims benefit of priority to U.S. Provisional Application Ser. No. 63/371,379, entitled "Federated Learning by Parameter Permutation," filed Aug. 12, 2022, and which is incorporated herein by reference in its entirety.

BACKGROUND

Machine learning models provide important decision making features for various applications across a wide variety of fields. Given their ubiquity, greater importance has been placed on understanding the implications of machine learning model design and training data set choices on machine learning model performance. Systems and techniques that can provide greater adoption of machine learning models are, therefore, highly desirable.

SUMMARY

Parameter permutation is performed for federated learning to train a machine learning model. A client system of an aggregation server, may update parameters of a machine learning model based on encrypted parameters received from the aggregation server and decrypted by the client system using a secret key of a public-secret key pair obtained at the client system. Local updates to the parameters of the machine model may be computed by the client system according to a machine learning technique using local training data. The parameters of the federated machine learning model may be randomized at the client system. An intra-model shuffling may be applied to the randomized parameters according to a shuffling pattern at the client system. The shuffled parameters may be encoded at the client system using the secret key. The client system may provide the encoded parameters to the server of the federated machine learning system using one or more Private Information Retrieval (PIR) queries generated according to the shuffling pattern that allow the aggregation server to retrieve each of the encoded local parameter privately during aggregation.

BRIEF DESCRIPTION OF THE DRAWINGS

FIG. 2 is a logical block diagram illustrating an example shuffling pattern window, according to some embodiments.

FIG. 4 illustrates an example algorithm for performing parameter permutation for federated machine learning, according to some embodiments.

Figure 1A:
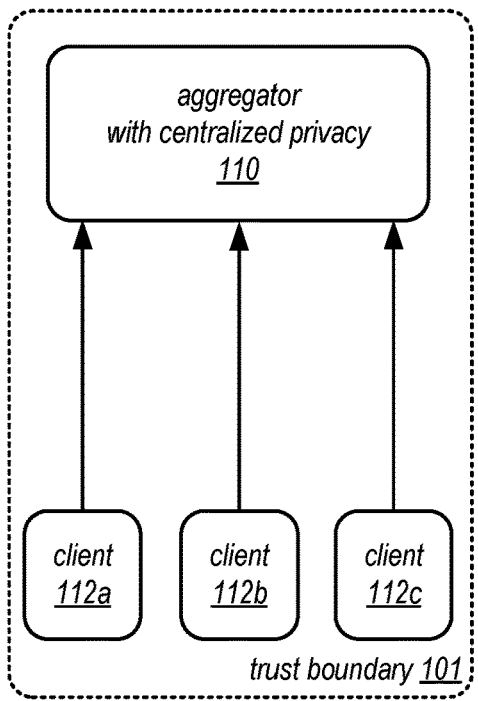
FIGS. 1A-1D are logical block diagrams illustrating different models of differential privacy for federated machine learning, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (e.g., meaning having the potential to) rather than the mandatory sense (e.g. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Various techniques for private and robust federated learning by parameter permutation are described herein. Federated Learning (FL) is a distributed, collaborative machine learning paradigm that enables mutually untrusting clients to collaboratively train a common machine learning model. Client data privacy is paramount in FL scenarios. At the same time, the machine learning model should also be protected from poisoning attacks from adversarial clients. While some techniques address these technical challenges in isolation, as described in detail below, various embodiments of parameter permutation for federated learning may address both these challenges, combining an intra-model parameter shuffling technique that amplifies data privacy, with Private Information Retrieval (PIR) based techniques that permit cryptographic aggregation of clients' machine learning model updates. The combination of these techniques further enables a federation server (sometimes referred to as an aggregation server) to constrain parameter updates from clients so as to curtail effects of model poisoning attacks by adversarial clients. Additionally, in various embodiments, the hyperparameters of parameter permutation techniques for federated learning as described below can be used to effectively trade off computation overheads with model utility.

In various embodiments, federated learning training involves a server (or collection of multiple computing devices that act as a server) that aggregates, using an aggregation rule (AGR), machine learning model updates that clients participating in federated machine learning compute using their local private data. The aggregated global machine learning model is thereafter broadcasted by the server to a subset of the clients. This process repeats for several rounds until convergence or a threshold number of rounds.

Though highly promising, federated learning faces multiple technical challenges to its practical deployment. As noted above, two of these technical challenges are (i) providing data privacy for clients' training data, and (ii) providing robustness of the global machine learning model in the presence of malicious clients. The data privacy challenge emerges from the fact that raw model updates of federation clients are susceptible to privacy attacks by an adversarial aggregation server. Two classes of approaches can address this problem in significantly different ways: First, Local Differential Privacy (LDP) enforces a strict theoretical privacy guarantee to model updates of clients. The guarantee is enforced by applying carefully calibrated noise to the clients' local model updates using a local randomizer R. While this technique provides the privacy guarantee that it can defend against poisoning attacks by malicious clients, the noise added to the client's local model updates used to provide the LDP guarantee significantly degrades model utility.

The other approach to enforce client data privacy is secure aggregation (sometimes referred to as "sAGR"), where model update aggregation is done using cryptographic techniques such as partially homomorphic encryption or secure multi-party computation. sAGR protects privacy of clients' data from an adversarial aggregation server because the server sees just the encrypted version of clients' model updates. Moreover, this privacy is enforced without compromising global model utility. However, the encrypted model updates themselves provide the perfect cover for a malicious client to poison the global model—the server cannot tell the difference between a honest model update and a poisoned one, since both are encrypted.

In various embodiments, an efficient federated learning algorithm that achieves local privacy for participating clients at a low utility cost, while ensuring robustness of the global model from malicious clients may be highly desirable as it addresses many of the technical challenges to federated learning, including those noted above.

The starting point of parameter permutation for federated learning techniques implemented and described in various embodiments below is privacy amplification by shuffling, which enables stronger (e.g., amplified) privacy with little model perturbation (using randomizer R) at each client. This technique differs from other techniques because intra-model parameter shuffling is applied rather than the inter-model parameter shuffling done previously.

Next, each parameter permutation for federated learning client chooses its shuffling pattern uniformly at random for each round of federated learning, which is private to that client. To aggregate the shuffled (and perturbed) model parameters, a client may utilize computational Private Information Retrieval (sometimes referred to as "cPIR") to generate a set of PIR queries for its shuffling pattern that allows the server to retrieve each parameter privately during aggregation. All that the server observes is the shuffled parameters of the model update for each participating client, and a series of PIR queries (e.g., the encrypted version of the shuffling patterns). The server can aggregate the PIR queries and their corresponding shuffled parameters for multiple clients to get the encrypted aggregated model. The aggregated model is decrypted independently at each client.

The combination of LDP enforcement at each client and intra-model parameter shuffling achieves enough privacy amplification to let parameter permutation for federated learning preserve high model utility, such that the noise added for privacy does not degrade the predictive performance of the model when deployed to make predictions (sometimes referred to as "inferences") as part of a system, service, or application that uses a machine learning model trained according to the below described federated learning techniques. At the same time, availability of the shuffled parameters at the federation server lets the federation server control a client's model update contribution by checking and enforcing norm-bounding, which is known to be highly effective against model poisoning attacks In various embodiments, parameter permutation for federated learning utilizes cPIR may rely on homomorphic encryption, though it can be computationally expensive, particularly for large models. However, hyperparameters may be implemented for the federated learning techniques, in some embodiments, that allow for computation/utility trade off hyper-parameters in parameter permutation for federated learning, that enables us to achieve an interesting tradeoff between computational efficiency and model utility. For example, one or more hyperparameters can be specified or changed to adjust the computation burden for a proper utility goal by altering the size and number of shuffling patterns for the parameter permutation for federated learning clients. Such hyperparameters allow various embodiments to provide LDP-federated learning guarantees at low model utility cost. In another example, hyperparameters can create shuffling windows whose size can be reduced to drastically cut computation overheads, but at the cost of reducing model utility due to lower privacy amplification (given a fixed privacy budget). In some embodiments, hyperparameter configurations can be set to provide "light" or "heavy" parameter permutation. For the hyperparameter configuration that provides a light version of parameter permutation for federated learning, where client encryption, and server aggregation need to perform using a limited amount of training time (e.g., 52.2 seconds and 21 minutes respectively), the result of federated learning to train a model that still provides some accurate results (e.g., 32.85% test accuracy) while still providing client data privacy and protection against poisoning attacks. For a hyperparameter configuration for client encryption and server aggregation with larger time allowances (e.g., 32.1 minutes and 16.4 hours respectively) greater model accuracy can be provided (e.g., 72.38% test accuracy) again while providing client data privacy and protection against poisoning attacks. The choice of hyperparameters allows for techniques for parameter permutation for federated learning to fit within the resources (e.g., time, computing resource utilization, etc.) allotted to performing federated learning.

The discussion that follows provides various examples of the terminology that can be used when discussing federated learning and the implementation of privacy preserving techniques. Non-Private Federated Learning is a starting point for the discussion which may culminate in the techniques for parameter permutation for federated learning, in various embodiments. For example, in a federated learning technique N clients collaborate to train a global machine learning model without directly sharing their data. In round t, the federation server (also referred to as the "aggregation server" or the "server") samples n out of N total clients and sends them the most recent global model $\theta^r$. Each client re-trains $\theta^r$ on its private data using a machine learning technique, such as stochastic gradient descent (SGD), and sends back the model parameter updates ($x_i$ for $i^{th}$ client) to the server. The server then aggregates (e.g., averages) the collected parameter updates and updates the global model for the next round $$\theta^t \leftarrow \theta^{t-1} + \frac{1}{n}\Sigma_{i=1}^{n} x_i.$$

FIG. 1A illustrates one approach for introducing privacy into federated learning, Central Differential Privacy in FL (CDP-FL). In CDP-FL, illustrated in FIG. 1A, a trusted server, aggregator with centralized privacy 110, first collects all the clients' (e.g., client 112a, 112b, and 112c, raw model updates ($x_i \in \mathbb{R}^d$), aggregates them into the global model, and then perturbs the model with carefully calibrated noise to enforce differential privacy (DP) guarantees. Then, aggregator with centralized privacy 110 provides participant-level DP by the perturbation. Trust boundary 101 illustrates that both aggregator 110 and clients 112a-112c "trust" the other participants to not harm the model (sometimes referred to as "poisoning"), either intentionally or unintentionally.

Formally, consider adjacent datasets $(X, X' \in \mathbb{R}^{n \times d})$ that differ from each other by the data of one federation client. The following provides a description of implementing differential privacy: A randomized mechanism $M: X \rightarrow Y$ is said to be ($\varepsilon$, $\delta$)-differential private if for any two adjacent datasets $X, X' \in X$ and any set $Y \subseteq \mathcal{Y}$:

$$Pr[M(X) \in Y] \leq e^{\varepsilon} Pr[M(X') \in Y] + \delta \quad (1)$$

where $\varepsilon$ is the privacy budget (lower the $\varepsilon$, higher the privacy), and $\delta$ is the failure probability.

Figure 1C:
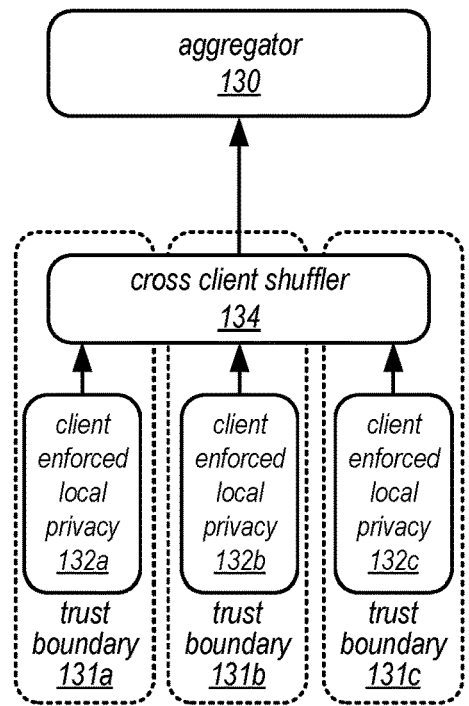
Figure 1B:
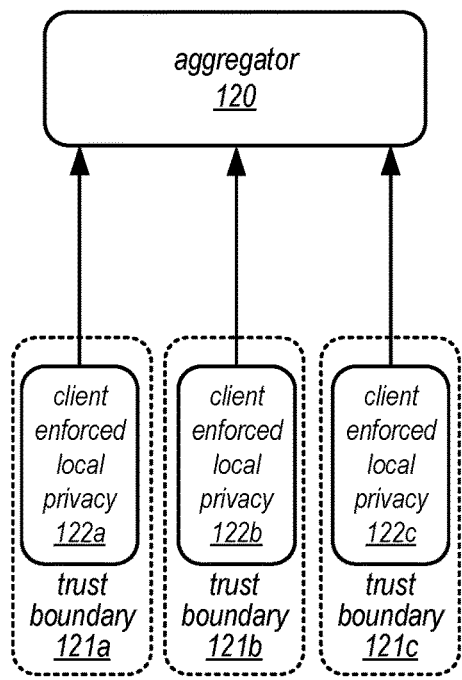

Another approach to implementing privacy in federated learning is illustrated in FIG. 1B. In FIG. 1B, Local Differential Privacy in FL (LDP-FL) is illustrated. While, CDP-FL (discussed above with regard to FIG. 1A) relies on availability of a trusted server for collecting raw model updates, LDP-FL does not rely on this assumption and each client (e.g., clients 122a, 122b, and 122c) perturbs its output locally using a randomizer R. If each client 122 perturbs its model updates locally by R which satisfies ($\varepsilon_l$, $\delta_l$)-LDP, then observing collected updates $\{R(x_1), \ldots, R(x_n)\}$ also implies ($\varepsilon_l$, $\delta_l$)-LDP. Aggregator 120 may then combine the provided parameter updates, as discussed above, before returning the global model to clients 122. In FIG. 1B, each client 122 may act respectively within its own trust boundary, 121a, 121b, and 121c respectively.

The following discussion provides a formal description of LDP. A randomized mechanism $R: X \rightarrow Y$ is said to be ($\varepsilon_l$, $\delta_l$) locally differential private if for any two inputs $x, x' \in X$ and any output $y \in Y$:

$$Pr[R(x)=y] \leq e^{\varepsilon_l} Pr[R(x')=y] + \delta_l \quad (2)$$

In LDP-federated learning, each client perturbs its local update, ($x_i$), with ($\varepsilon_l$, $\delta_l$)-LDP. Unfortunately, LDP hurts the utility, especially for high dimensional vectors. Its mean estimation error is bounded by $$O\left(\frac{\sqrt{d \log d}}{\varepsilon_l \sqrt{n}}\right)$$

meaning that for better utility, a higher privacy privacy budget or larger number of users in each round may be implemented.

Another technique that utilizes privacy amplification as part of providing client data privacy is illustrated in FIG. 1C. In FIG. 1C, the privacy amplification effect by shuffling, at cross client shuffler 134, model parameters across clients implementing local privacy, clients 132a, 132b, and 132c, model updates from participating clients 132 to improve the LDP-FL utility before providing them to aggregator 130. In FIG. 1C, each client 132 may act respectively within its own trust boundary, 131a, 131b, and 131c respectively.

Federated learning frameworks based on shuffling clients' updates may include three building processes: $M = A \circ S \circ R$. Specifically, they introduce a shuffler S, which sits between the FL clients and the FL server, and it shuffles the locally perturbed updates (by randomizer R) before sending them to the server for aggregation (A). More specifically, given parameter index i, S randomly shuffles the $i^{th}$ parameters of model updates received from the n participant clients. The shuffler thus detaches the model updates from their origin client (e.g., anonymizes them).

In a shuffle model, if R is $\varepsilon_l$-LDP, where $$\varepsilon_l \leq \log\left(\frac{n}{\log\left(\frac{1}{\delta_c}\right)}\right)/2.$$

M is ($\varepsilon_l$, $\delta_l$)-DP with $$\varepsilon_c \leq O\left((1 \wedge \varepsilon_l) e^{\varepsilon_l} \sqrt{\log\left(\frac{1}{\delta_c}\right)/n}\right)$$

where '$\wedge$' shows minimum function.

Figure 1D:
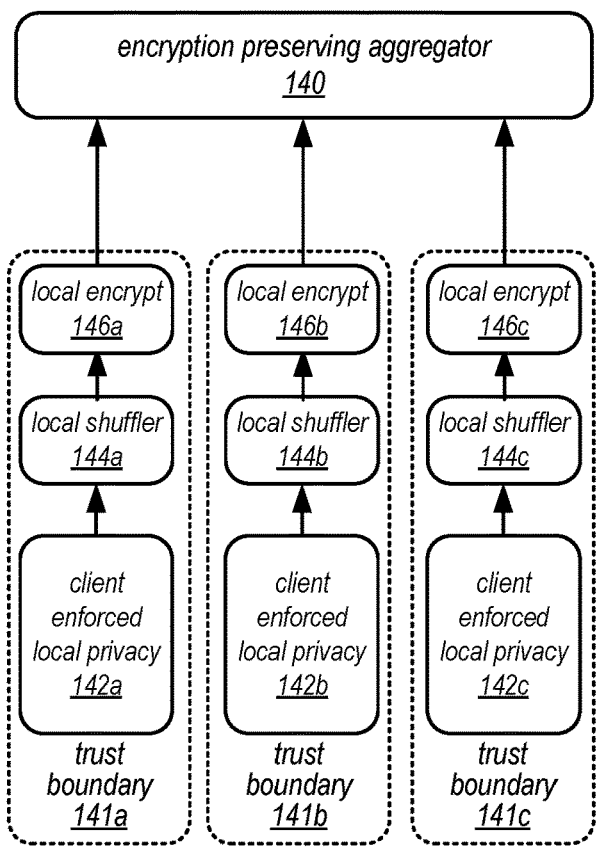

From the above corollary describing a shuffle model, the privacy amplification has a direct relationship with $\sqrt{n}$ where n is the number of selected clients for aggregation, (e.g., increasing the number of clients will increase the privacy amplification). Note that in parameter permutation for federated learning, the clients are responsible for shuffling, and instead of shuffling the n clients' updates (inter-model shuffling as depicted in FIG. 1C), each client locally shuffles its d parameters (intra-model shuffling as depicted in FIG. 1D). In some scenarios, there may be a limit on the value of n, so the amount of amplification that can be achieved may be correspondingly limited. However, the techniques for parameter permutation for federated learning allow for greater amplification because clients are shuffling the parameters and n≪d.

When considering the following description of techniques for parameter permutation for federated learning, Naïve and Strong Composition may be understood. (Naive Composition) $\forall_\varepsilon \geq 0$, $t \in \mathbb{N}$, may be the family of $\varepsilon$-DP mechanism that satisfies t$\varepsilon$-DP under t-fold adaptive composition.

(Strong Composition) $\forall \varepsilon$, $\delta$, $\delta' > 0$, $t \in \mathbb{N}$, may be the family of ($\varepsilon$, $\delta$)-DP mechanism that satisfies $$\left(\sqrt{2t\ln\left(\frac{1}{\delta'}\right)} \cdot \varepsilon + t \cdot \varepsilon(e^{\varepsilon}-1),\ t\delta + \delta'\right) - DP$$

under t-fold adaptive composition.

As discussed above, multiple threats to federated learning may exist. In FIG. 1D, and the following discussion, techniques for parameter permutation for federated learning are discussed that address multiple threats, including where (i) the federation server acts as an honest but curious aggregator, and (ii) the federation clients can maliciously attempt to poison the trained model using manipulated local parameter updates (as discussed in detail below with regard to FIGS. 5A and 5B).

In some embodiments, parameter permutation for federated learning utilizes computational Private Information Retrieval (sometimes referred to as "cPIR") for secure aggregation at the federation server. Algorithm 1, depicted in FIG. 4, provides an example depiction of algorithm for parameter permutation for federated learning. FIG. 1D depicts the parameter permutation for federated learning framework that consists of three components, $F = A \circ S \circ R^d$, denoting the client-side parameter randomizer ($R^d$), implemented at clients 142a, 142b, and 142c, the client-side shuffler (S), implemented as local shufflers 144a, 144b, and 144c, and the server-side aggregator (A), as encryption preserving aggregator 140. In FIG. 1D, each client may act respectively within its own trust boundary, 141a, 141b, and 141c respectively.

Figure 5A:
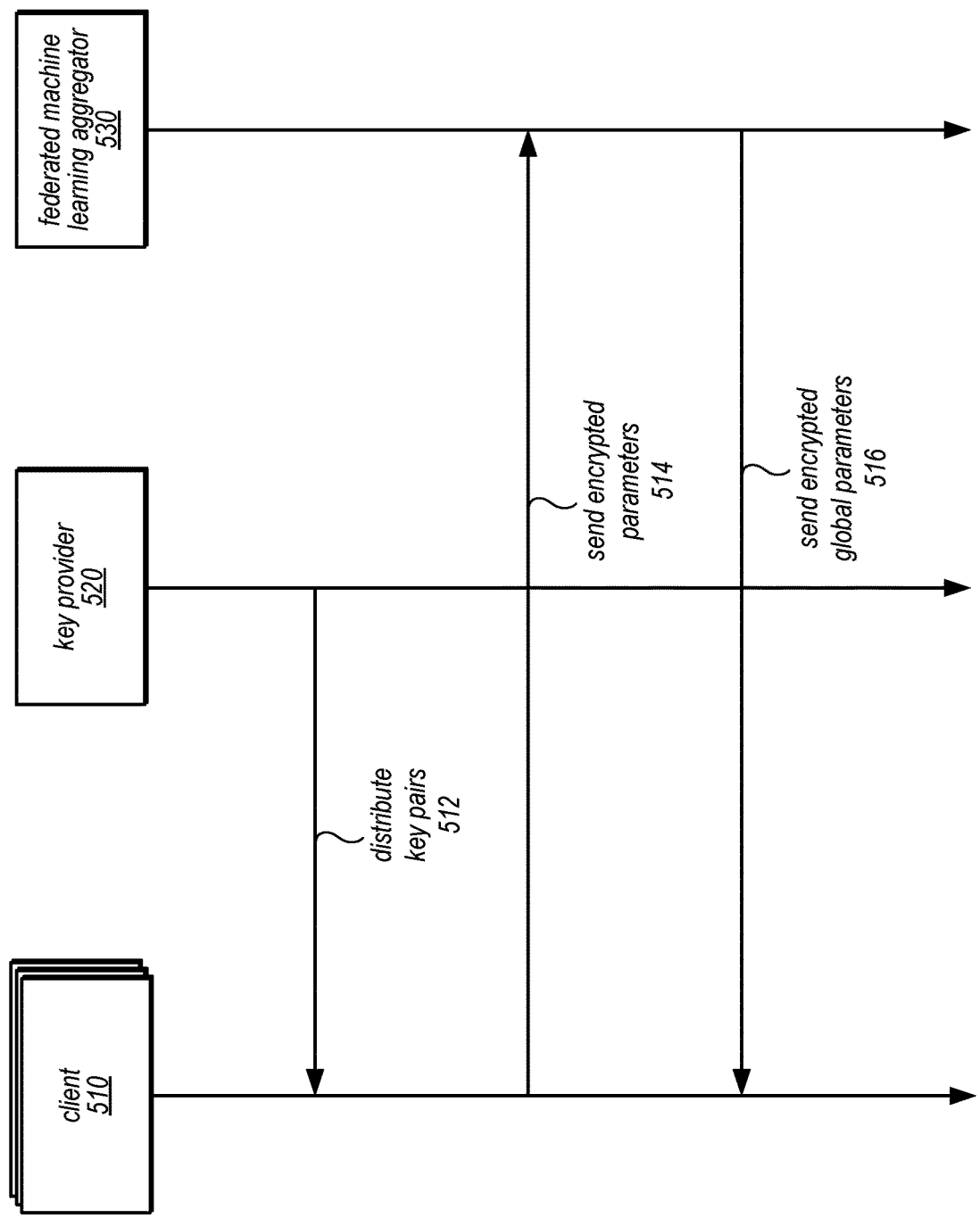
FIGS. 5A-5B are sequence diagrams illustrating parameter permutation for federated machine learning for different threat models, according to some embodiments.
Figure 5B:
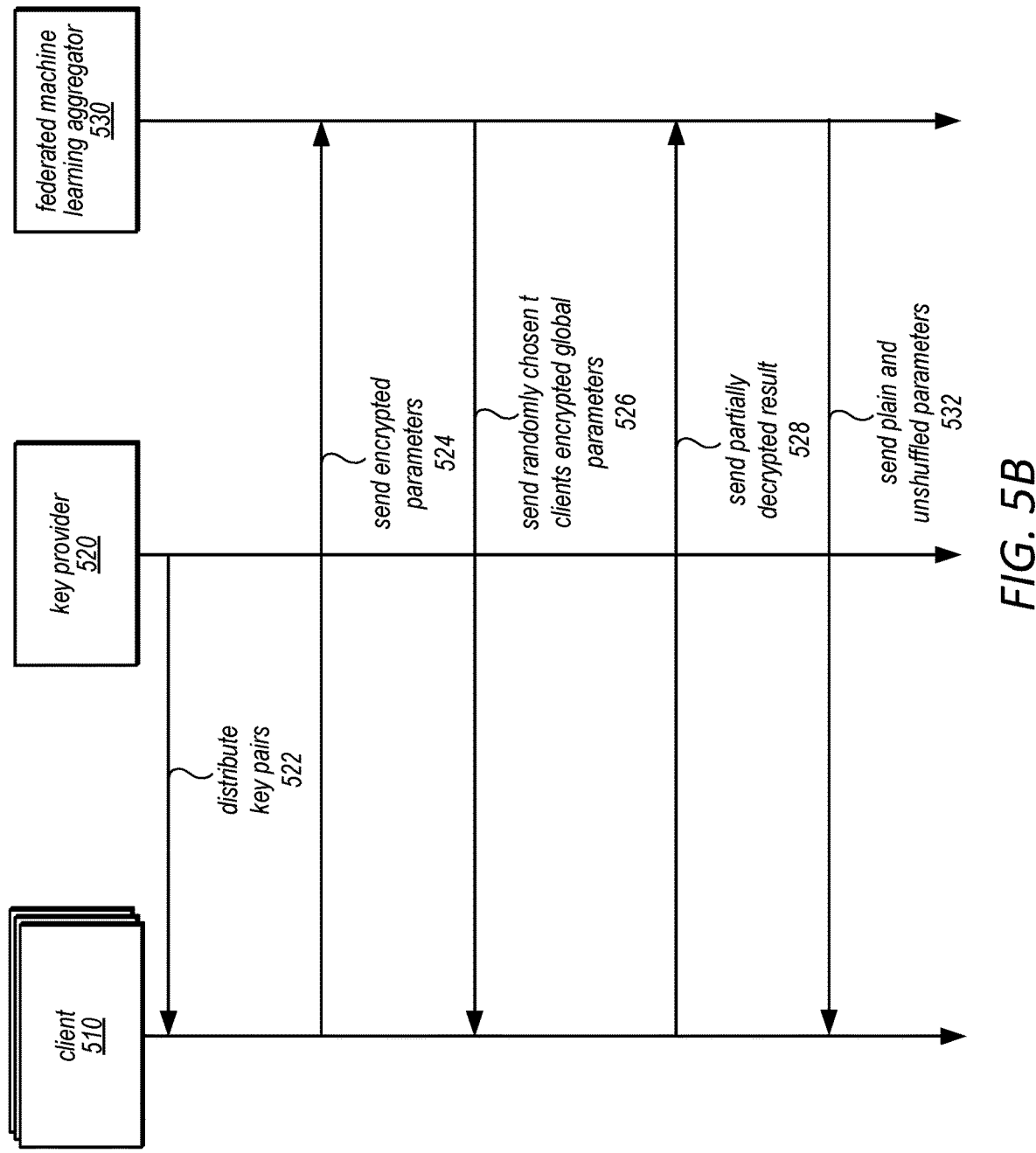

In various embodiments, Paillier is a partial HE (PHE) algorithm that may be implemented as part of performing parameter permutation for federated learning. Paillier that relies on a public key encryption scheme. Since Paillier is employed to protect client updates from a curious federation server, parameter permutation for federated learning may use an independent key server that generates a pair of public and secret homomorphic keys (Pk, Sk) (as depicted in FIGS. 5A and 5B). This key pair may be distributed to all federation clients, and just the public key Pk is sent to the federation server (for aggregation). The key server itself can be implemented as an independent third party server, or a leader among the federation clients may be chosen to play that role.

In the $t^{th}$ round, the server randomly samples n clients among total N clients. Each sampled client locally retrains a copy of the global model it receives from the server ($\theta_g^t$), optimizing the model using its local data and local learning rate η (Algorithm 1, FIG. 4, line 5).

Randomizing Update Parameters: After computing local updates $\theta_u^t$ client u clips the update using threshold C and normalizes the parameters to the range [0, 1] (Algorithm 1, FIG. 4, lines 6-7). Now the client applies the randomizer ($R^d$) on its local parameters to make them ($\varepsilon_d$)-differentially private (Algorithm 1, line 8). In various embodiments, a Laplace Mechanism may be implemented as the local randomizer with privacy budget $\varepsilon_d$, as discussed in detail below.

Shuffling: After clipping and perturbing the local update, each sampled client shuffles the parameters $y_u^t$ using the random shuffling pattern $\pi_u$ (Algorithm 1 line 9-10). This shuffling step amplifies the privacy budget $\varepsilon_d$.

Generating PIR queries: Now the client encodes the shuffle indices $\pi_u$ using a PIR protocol. This process comprises two steps, as indicated at local encrypt 146a, 146b, and 146c: first creating a binary mask of the shuffled index, and then encrypting it using the public key of HE that the client received in first step (Algorithm 1, FIG. 4, line 11-12).

Generally, a PIR client may access to the $j^{th}$ record privately from an untrusted PIR server that holds a dataset θ with d records; e.g., the PIR server cannot know that the client requested the $j^{th}$ record. To do so, the PIR client creates a unit vector (binary mask) $\vec{b}_j$ of size d where all the bits are set to zero except the $j^{th}$ position being set to one:

$$\vec{b}_j = [0\ 0\ \ldots\ 1\ \ldots\ 0\ 0] \quad (3)$$

If the PIR client does not care about privacy, it would send $\vec{b}_j$ to the PIR server, and the server would generate the client's response by multiplying the binary mask into the database matrix $\theta$ ($\theta_j = \vec{b}_j \times \theta$). A PIR technique allows the client to obtain this response without revealing $\vec{b}_j$ to the PIR server. For example, the PIR client may use HE to encrypt $\vec{b}_j$ element by element before sending it to the PIR server. During the data recovery phase, the client extracts its target record by decrypting the component of $\text{ENC}(\vec{b}_j) \times \theta$. Equation 4 shows retrieving the $j^{th}$ record by this PIR query. Note that a HE system has a property that $m_1 \times m_2 \leftarrow \text{DEC}(\text{ENC}[m_1] \times m_2)$, and the decryption or decrypt is represented by DEC and encryption or encrypt is represented by ENC.

$$DEC\left(ENC(\vec{b}_j) \times \theta\right) = \quad (4)$$
$$DEC\left(ENC[0] \cdot \theta_1 + \ldots + ENC[1] \cdot \theta_j + \ldots + ENC[0] \cdot \theta_d\right) =$$
$$DEC\left(ENC[\theta_j]\right) = \theta_j$$

A client creates cPIR queries to retrieve each parameter privately. In some embodiments, techniques may be implemented to reduce the number of cPIR queries. In some embodiments, the shuffled parameters ($\tilde{y}_u^t$) are the dataset located at the PIR server and each shuffled index in $\pi_u$ is the secret record row number (e.g., $j^{th}$ in above) that the PIR client is interested in. Client u first creates $b_u^t$ which is a collection of d binary masks of shuffled indices in $\pi_u$, similar to PIR query $\vec{b}_j$ in Equation 3. Then the client encrypts the binary masks and sends the shuffled parameters and the PIR query (encrypted binary masks) to the server for aggregation.

Correctness: Note that for every client u and every round t, decrypting the multiplication of the encrypted binary masks to the shuffled parameters produces the original unshuffled parameters. It means that for $y_u^t = \text{DEC}(c_u^t \times \tilde{y}_u^t)$. So for any ($\tilde{y}$, c) there is:

$$DEC(c \times \tilde{y}) = DEC\left(\begin{bmatrix} ENC(\vec{b}_{\pi_1}) \\ ENC(\vec{b}_{\pi_2}) \\ \ldots \\ ENC(\vec{b}_{\pi_d}) \end{bmatrix} \times \begin{bmatrix} \tilde{y}_1 \\ \tilde{y}_2 \\ \ldots \\ \tilde{y}_d \end{bmatrix}\right) = \quad (5)$$

$$DEC\left(\begin{bmatrix} ENC[0] & \ldots & ENC[1] & \ldots & ENC[0] \\ ENC[0] & \ldots & ENC[1] & \ldots & ENC[0] \\ \ldots & \ldots & \ldots & \ldots & \ldots \\ ENC[0] & \ldots & ENC[1] & \ldots & ENC[0] \end{bmatrix} \times \begin{bmatrix} y_1^\pi \\ y_2^\pi \\ \ldots \\ y_d^\pi \end{bmatrix}\right) =$$

$$DEC\left([ENC[y_1]\ ENC[y_2]\ \ldots\ ENC[y_d]]\right) = [y_1\ y_2\ \ldots\ y_d]$$

Server: norm bounding. After collecting all the local updates ($\tilde{y}_u^t$, $c_u^t$) for selected clients in round t, the parameter permutation for federated learning server first applies $\ell_2$-norm bounding to the threshold M on the shuffled parameters $\tilde{y}_u^t$ (Algorithm 1, FIG. 4, line 15). Note that unlike other robust AGRs, norm bounding does not use the true position of the parameters because it works by calculating the $\ell_2$-norm of the parameter updates as a whole irrespective of their order, e.g., $\ell_2(\tilde{y}_u^t) = \ell_2(y_u^t)$.

Server: Aggregation Then the server aggregates all the updates into global update $\bar{z}$ (Algorithm 1, FIG. 4, line 16). This aggregation is averaging the update parameters for n collected updates by calculating $$\frac{1}{n}\sum_{u \in U}(c_u^t \times \tilde{y}_u^t).$$

The expression $c_u^t \times \tilde{y}_u^t$ has the effect of "'unshuffling" client u's parameters. At the same time, the resulting vector is encrypted, thus kept hidden from the server.

Correctness of Aggregation: In Equation 5, it is shown that $\forall t \in [T]$, $u \in U$ $y_u^t = \text{D\scriptsize EC}(c_u^t \times \tilde{y}_u^t)$. Based on the two main properties of an HE system (a) $m_1 \times m_2 \leftarrow \text{D\scriptsize EC}(\text{E\scriptsize NC}[m_1] \times m_2)$, (b) $m_1 + m_2 \leftarrow \text{D\scriptsize EC}(\text{E\scriptsize NC}[m_1] + \text{E\scriptsize NC}[m_2])$, and Equation 5, Equation 6 may be derived as:

$$DEC\left(\frac{1}{n}\sum_{u \in U}(c_u^t \times \tilde{y}_u^t)\right) = \frac{1}{n}\sum_{u \in U} y_u^t \qquad (6)$$

Updating Global Model. The parameter permutation for federated learning server aggregates the local updates ($\tilde{y}_u^t$, $c_u^t$) without knowing the true position of the parameters as the parameters are detached from their positions. Result of aggregation $$\frac{1}{n}\sum_{u \in U}(c_u^t \times \tilde{y}_u^t)$$

is vector of encrypted parameters, and they may have to be decrypted to be used for updating the global model (Algorithm 1, FIG. 4 lines 17-19). This decryption is done at each client (not depicted) using Paillier's secret key.

Each parameter permutation for federated learning client perturbs its local update (vector x.; containing d parameters) with randomizer $R^d$ which is $\varepsilon_d$-LDP, and then shuffles its parameters. In some embodiments, a Laplacian mechanism as the randomizer. Based on the naive composition theorem above, the client perturbs each parameter value with R which satisfies $\varepsilon_{wd}$-LDP where $$\varepsilon_{wd} = \frac{\varepsilon_d}{d}.$$

The corollary below snows the privacy amplification from $\varepsilon_d$-LDP to $(\varepsilon_l, \delta_l)$-DP after the parameter shuffling. This derived by substituting the number of participating clients n by the number of parameters d in the model:

Corollary: If R is $\varepsilon_{wd}$-LDP, where $$\varepsilon_{wd} \leq \log\left(\frac{d}{\log\left(\frac{1}{\delta_l}\right)}\right)/2$$

then the federated permutation $F = A \circ S \circ R^d$ satisfies $(\varepsilon_l, \delta_l)$-DP with $$\varepsilon_l = O((1 \wedge \varepsilon_{wd})e^{\varepsilon_{wd}}\sqrt{\frac{\log\left(\frac{1}{\delta_l}\right)}{d}}).$$

Thus, larger the number of parameters in the model, greater is the privacy amplification. With large models containing millions or billions of parameters, the privacy amplification can be immense. However, the model dimensionality also affects the computation (and communication) cost in parameter permutation for federated learning. Each parameter permutation for federated learning client can generate a d-dimensional PIR query for every parameter in the model resulting in a PIR query matrix containing $d^2$ entries. In various embodiments, techniques for parameter permutation for federated learning may use additional hyperparameters in some scenarios to configure federated learning performance to configure computation/communication overheads and model utility.

Instead of shuffling all the d parameters, the parameter permutation for federated learning client can partition its parameters into several identically sized windows, and shuffle the parameters in each window with the same shuffling pattern. Thus, instead of creating a very large random shuffling pattern π with d indices (e.g., π=R\scriptsize ANDOM\scriptsize PERMUTATIONS[1, d], each client creates a shuffling pattern with $k_1$ indices (e.g., π=R\scriptsize ANDOM\scriptsize PERMUTATIONS[1, $k_1$]) each window with these random indices.

The window size $k_1$ is one hyperparameter for parameter permutation for federated learning that can be used, in some embodiments, to control the computation/communication and model utility trade off. Once the size of shuffling pattern is set to $k_1$, each client may perform $d \cdot k_1$ encryptions and consumes $O(d \cdot k_1)$ network bandwidth to send its PIR queries to the server.

Superwindow: A shuffling window size of $k_1$, partitions each parameter permutation for federated learning client u's local update $x_u$ (d parameters) into $w=d/k_1$ windows, each containing $k_1$ parameters. Each parameter permutation for federated learning client, independently from other parameter permutation for federated learning clients, chooses its shuffling pattern π uniformly at random with indices ∈ [1, $k_1$], and shuffles each window with this pattern. This means that every position $j(1 \leq j \leq k_1)$ in each window $k(1 \leq k \leq w)$ will have the same permutation index $(\pi_j)$. Thus all of the $j^{th}$ positioned parameters $(x_u^{(k,j)}$ for $1 \leq k \leq w)$ will contain the value from the $\pi_j^{th}$ slot in window k. For a given index $j(1 \leq k \leq w)$, a superwindow may be defined as the set of all of the parameters $x_u^{(k,j)}$ for $1 \leq k \leq w$. If the parameter vector $x_u$ is structured (with d parameters) as $\mathbb{R}^{k_1 \times w}$ (a matrix with $k_1$ rows and w columns), each row of this matrix is a superwindow.

FIG. 2 depicts an example model containing 12 parameters $\theta = [\theta_1, \theta_2, \ldots, \theta_{12}]$. The original parameter permutation for federated learning algorithm mandates a shuffling pattern π with 12 indices ∈ [1,12], where the PIR query generates 12×12=144 encryptions. However, a shuffling pattern π of three indices $k_1=3$ (π=[3, 1, 2] in the figure) may use only 3×3=9 encryptions. This shuffling pattern creates 4 windows, 202a, 202b, 202c, and 202d, of size 3, and each row in the 2-D matrix, represented more succinctly by [$\Theta_A$, $\Theta_B$, $\Theta_C$] itself constitutes a superwindow. The shuffling pattern $\pi=[3, 1, 2]$ applied to $\theta=[\Theta_A, \Theta_B, \Theta_C]$ swaps entire superwindows to give $S_{k_1}(\theta)=[\Theta_A, \Theta_B, \Theta_C]$.

Shuffling of superwindows, instead of individual parameters, leads to a significant reduction in the computation (and communication) overheads for parameter permutation for federated learning clients. However, this comes at the cost of smaller privacy amplification. The privacy amplification of parameter permutation for federated learning goes from $\varepsilon_d$-LDP to $(\varepsilon_\ell, \delta_\ell)$-DP after superwindow shuffling (with window size $k_1$). After applying the randomizer R that is $\varepsilon_d$-LDP on the local parameters, each superwindow is $\varepsilon_w$-LDP where $$\varepsilon_w = w \cdot \varepsilon_{wd} = \frac{d}{k_1} \cdot \varepsilon_{wd} = \frac{\varepsilon_d}{k_1}.$$

Since we are shuffling the superwindows, parameter permutation for federated learning may be derived by setting the shuffling pattern size to $k_1$. Accordingly:

For $F = A \circ S \circ R^w$ with window size $k_1$, where $R^w$ is $\varepsilon_w$-LDP and $$\varepsilon_{wd} \le \log\left(\frac{k_1}{\log\left(\frac{1}{\delta_l}\right)}\right)/2$$

the amplified privacy is $$\varepsilon_l = O((1 \wedge \varepsilon_w) e^{\varepsilon_w} \sqrt{\log\left(\frac{1}{\delta_l}\right)/k_1}.$$

Another way to adjust the computation/communication vs. utility tradeoff is by using multiple shuffling patterns, which may be implemented in some embodiments. Each parameter permutation for federated learning client chooses $k_2$ shuffling patterns $\{\pi_1, \ldots, \pi_{k_2}\}$ uniformly at random where each $\pi_i$=RANDOMPERMUTATIONS$[1, k_1]$ for $1 \le i \le k_2$. Then, each parameter permutation for federated learning client partitions the d parameters into $d/k_1$ windows, where it permutes the parameters of window $$k(1 \le k \le \frac{d}{k_1})$$

with shuffling pattern $\pi_i$ such that $i = k \mod k_2$. In this case, each parameter permutation for federated learning client may have $k_2 \cdot k_1^2$ encryptions to generate the PIR queries.

Figure 3:
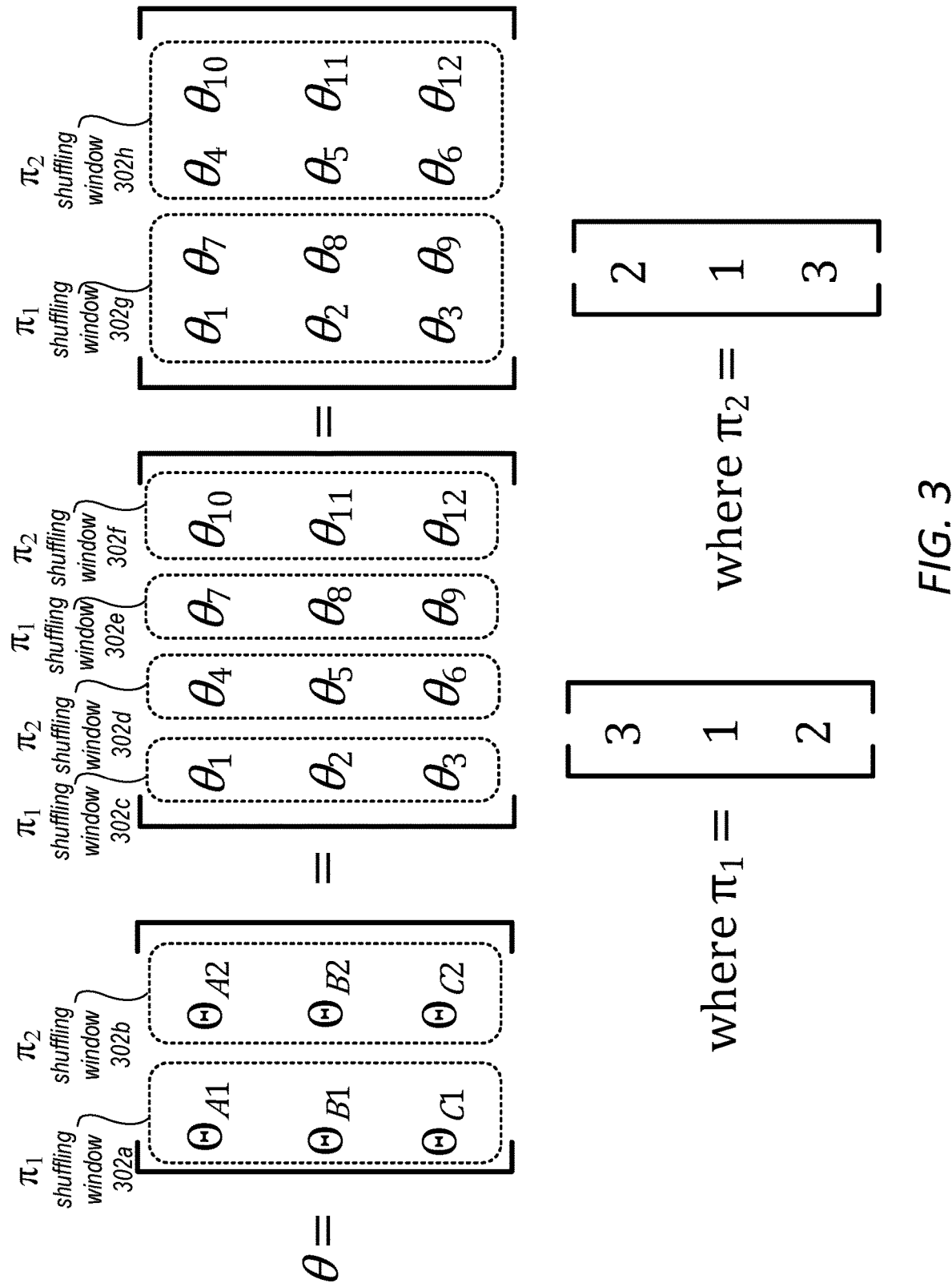
FIG. 3 is a logical block diagram illustrating using multiple shuffling patterns, according to some embodiments.

FIG. 3 shows parameter permutation for federated learning for $d=12$, $k_1=3$ and $k_2=2$, e.g., there are two shuffling patterns $\pi_1$ and $\pi_2$ and each one has 3 shuffling indices. In this example, the client partitions the 12 parameters into shuffling windows, 302a, 302b, 302c, 302d, 302e, 302f, 302g, and 302h, that it shuffles with $\pi_1$ (1st and 3$^{rd}$ windows) and $\pi_2$ (2nd and 4th windows). This example is similar to an FL scenario with two external inter-model shufflers (with shuffling patterns $\pi_1, \pi_2$) and three FL clients (A, B, C). Each client sends 2 ($w=d/(k_1k)$) parameters to each shuffler for shuffling with other clients. Two different shuffling patterns $\pi_1$ and $\pi_2$ are applied on $[\Theta_{A1}, \Theta_{B1}, \Theta_{C1}]$ and $[\Theta_{A2}, \Theta_{B2}, \Theta_{C2}]$ respectively.

When there are $k_2$ shuffling patterns and each shuffling pattern has $k_1$ indices, the size of each superwindow is $w=d/(k_1k_2)$. Therefore, each client perturbs each superwindow with a randomizer $R^w$ that satisfies $\varepsilon_w$-LDP where $$\varepsilon_w = w \cdot \varepsilon_{wd} = \frac{d}{k_1k_2} \cdot \varepsilon_{wd} = \frac{\varepsilon_d}{k_1k_2}.$$

Take $\varepsilon_w$ on the superwindows to find the amplified local privacy and then using strong composition discussed, parameter permutation for federated learning with $S_{k_1}^{k_2}$. Accordingly:

For $F = A \circ S_{k_1}^{k_2} \circ R^w$ with window size $k_1$ and $k_2$ shuffling patterns, where $R^w$ is $\varepsilon_w$-LDP and $$\varepsilon_w \le \log\left(\frac{k_1}{\log((k_2+1)\delta_l)}\right)/2,$$

the amplified privacy is $$\varepsilon_l = O\left((1 \wedge \varepsilon_w) e^{\varepsilon_w} \log\left(\frac{k_2}{\delta_l}\right)\sqrt{k_2/k_1}\right).$$

There may be relationship between variables $k_1$, $k_2$, $\varepsilon_d$ and d on the privacy amplification in parameter permutation for federated learning is discussed below. The privacy amplification effect from $\varepsilon_d$-LDP to $(\varepsilon_\ell, \delta_\ell)$-DP for the local model updates after shuffling with $k_2$ shuffling patterns each with size of $k_1$ may be determined. For each client using larger shuffling patterns (e.g., increasing $k_1$) or more shuffling patterns (e.g., increasing $k_2$), larger privacy amplification may be obtained. A tradeoff to consider is that the privacy amplification increase imposes more computation/communication burden on the clients to create the PIR queries, as they may have to encrypt $k_2 \times k_1^2$ values and send them to the server, and it also imposes higher computation on the server as it should multiply larger matrices. Accordingly, to provide a certain privacy level for larger models, the values of $k_1$ or $k_2$ may have to be increased.

Client encryption time: In parameter permutation for federated learning, each client may perform $k_1^2 \cdot k_2$ encryptions for its query, therefore client encryption time may have a quadratic and linear relationship with window size ($k_1$) and number of shuffling patterns ($k_2$) respectively in some scenarios. Increasing the $k_1$ has more impact compared to increasing $k_2$ on the privacy amplification. This means that if more computation resources were utilized on the clients and are able to do more encryption, greater privacy amplification may be obtained by parameter shuffling. For instance, if the $k_1$ is increased from 100 to 200 (while fixing $k_2=1$), the average client encryption time increases, for example, from 3.4 to 13.1 seconds for d=7850 parameters. And while fixing the $k_1=100$, the number of shuffling patterns may be increased from 1 to 10, the encryption time may increase, for example from 3.4 to 32.7 seconds. The value of $k_1$ and $k_2$ is fixed, the number of encryption is fixed at the clients, so the encryption time would be constant if the number of parameters (d) is increased each round.

Client decryption time: Changing $k_1$, $k_2$, and n may not have any impact on decryption time, as each client should decrypt d parameters. There may be a linear relationship of decryption time and number of parameters. For instance, by increasing the number of parameters from 105 to 106, the decryption time may increase from 1.01 to 9.91 seconds.

Server aggregation time: In parameter permutation for federated learning, the server first multiplies the encrypted binary mask to the corresponding shuffled model parameters for each client participating in the training round, and then sums the encrypted unshuffled parameters to compute the encrypted global model. In some embodiments, different software libraries may be implemented to perform parallel matrix multiplication over super windows (e.g., using joblib in Python). Thus, the larger the superwindows, the greater the parallelism. However, as $k_1$ and/or $k_2$ are increased, the superwindow size goes down, and consequently reducing the parallelism, which leads to increase in running time. Moreover, increasing n, d may have a linear relationship with server aggregation time. For instance, when increased from 5 to 10, the server aggregation time increases from 157.47 to 326.72 seconds for d=7850, $k_1$, =100, and $k_2$=1.

As discussed above, techniques for parameter permutation for federated learning may address threats from an aggregation server in addition to client-based threats. FIGS. 5A-5B are sequence diagrams illustrating parameter permutation for federated machine learning for different threat models, according to some embodiments.

One threat model may be Honest-but-Curious Aggregator. In this threat model, the aggregation server correctly follows the aggregation algorithm, but may try to learn clients' private information by inspecting the model updates sent by the participants. For creating the PIR queries, Paillier homomorphic encryption may be used (as discussed above). Before starting parameter permutation for federated learning, a key server may be used to generate and distribute the keys for the homomorphic encryption (HE). A key server generates a pair of public and secret homomorphic keys (Pk, Sk), sends them to the clients, and sends only the public key to the server. Either a trusted external key server or a leader client can be responsible for this role. For the leader client, before the training starts, the aggregation server randomly selects a client as the leader. The leader client then generates the keys and distributes them to the clients and the server as above.

For example, as illustrated in FIG. 5A, key provider 520 (e.g., a selected leader client or an external key server) may generate and distribute 512 the pair of keys to clients 510. The pair of keys are distributed by the key server to all the clients. In each round of training, the clients learn their local updates using local data, generate an encrypted PIR query and shuffled parameters, and send them to the federated machine learning aggregator 530 (e.g., an aggregation server, federation server, or other federated machine learning system, such as discussed below with regard to FIG. 6), as indicated at 514. Next, the federate machine learning aggregator 530 aggregates the updates, and sends the aggregated update to the clients 510, as indicated at 516. Each client can decrypt the encrypted global parameters received from the server using the secret key and updates its local copy of the global machine learning model. Elements 514 and 516 may be repeated for multiple rounds of federated learning.

Another threat model that can be addressed using parameter permutation for federated learning techniques may be Curious and Colluding Clients. In this threat model, some clients may collude with the FL server to get private information about a victim client by inspecting its model update. For this threat model, thresholded Paillier may be used. In the thresholded Paillier scheme, the secret key is divided to multiple shares, and each share is given to a different client. For this threat model, an external key server may generate the keys and sends (Pk, $Sk_i$) to each client, and sends the public key to the server. Now each client can partially decrypt an encrypted message, but if less than a threshold, say t, combine their partial decrypted values, they cannot get any information about the real message. On the other hand, if combining ≥t partial decrypted values, the secret can be recovered.

FIG. 5B illustrates techniques for handling the Curious and Colluding Clients threat model. As indicated at 522, the pairs of keys are distributed to the clients 510 by the key provider 520. In each round of training, the clients 510 learn their local updates. generate encrypted PIR query and shuffled parameters, and send them to the federated learning machine learning aggregator 530, as indicated at 524. Next, the federated machine learning aggregator 530 aggregates the local updates to produce global model update (which is encrypted). The federated machine learning aggregator 530 randomly chooses t clients to partially decrypt the global model update. The federated machine learning aggregator 530 sends the encrypted global update to these clients 510, as indicated at 526. Each client 510 decrypts the global model with its specific partial secret key $Sk_i$, and sends the result back to the federated machine learning aggregator 530, as indicated at 528. The server first authenticates each partial decryption that is done by the true $Sk_i$ (e.g., by a zero-knowledge proof provided by thresholded Paillier). Then the federated machine learning aggregator 530 combines the partial decrypted updates and broadcasts plain unshuffled model updates, as indicated at 532 to all the clients for the next round of parameter permutation for federated learning.

The following discussion provides further details for performing local randomization using a Laplace mechanism. In parameter permutation for federated learning techniques, each client i applies a Laplace mechanism as a randomizer R on its local model update ($x_i$). A Laplace mechanism may be described where $f:X^n \to \mathbb{R}^k$ such that the Laplace mechanism implementing randomizer R is $$R(X)=f(X)+[Y_1, \ldots, Y_k] \qquad (8)$$

Where the $Y_i$'s are drawn independent and identically distributed (i.i.d.) from Laplace ($\Delta^{(f)}/\varepsilon$) random variable. This distribution may have the density of $$p(x) = \frac{1}{2b}\exp(-\frac{|x|}{b})$$

where b is the scale and equal to $\Delta^{(f)}/\varepsilon$.

Each model update contains d parameters in range of [0, 1], so the sensitivity of the entire input vector is d. It means that applying $\varepsilon_d$-DP on the vector $x_i$, is equal to applying $\varepsilon_{wd}=\varepsilon_d/d$ on each parameter independently. Therefore, applying $\varepsilon_d$-DP randomizer R on the vector x, means adding noise from Laplace distribution with scale $$b = \frac{1}{\varepsilon_{wd}} = \frac{1}{\frac{\varepsilon_d}{d}} = \frac{d}{\varepsilon_d}.$$

The following discussion provides further details for PIR techniques discussed above. PIR is a technique to provide query privacy to users when fetching sensitive records from untrusted database servers. That is, PIR enables users to query and retrieve specific records from untrusted database server(s) in a way that the servers cannot identify the records retrieved. There are two major types of PIR protocols. The first type is computational PIR (CPIR) in which the security of the protocol relies on the computational difficulty of solving a mathematical problem in polynomial time by the servers, e.g., factorization of large numbers. Most of the CPIR protocols are designed to be run by a single database server, and therefore to minimize privacy leakage they perform their heavy computations on the whole database (even if a single entry has been queried). Most of these protocols use homomorphic encryption to make their queries private. The second major class of PIR is information-theoretic PIR (ITPIR). ITPIR protocols provide information theoretic security, however, existing designs may have to be run on more than one database servers, and they may have to assume that the servers do not collude.

The following discussion provides further details of Homomorphic Encryption (HE) that may be used in various techniques. Homomorphic encryption (HE) allows application of certain arithmetic operations (e.g., addition or multiplication) on the ciphertexts without decrypting them. In some embodiments, partial HE, that only supports addition, may be implemented to make the federated learning aggregation more secure. The following are two examples of HE that can be used in various embodiments.

Paillier. An additively homomorphic encryption system provides following property:

$$\text{Enc}(m_1) \circ \text{Enc}(m_2) = \text{Enc}(m_1 + m_2) \quad (9)$$

where $\circ$ is a defined function on top of the ciphertexts.

The clients encrypt their updates, send them to the server, then the server can calculate their sum (using the $\circ$ operation) and sends back the encrypted results to the clients. Now, the clients can decrypt the global model locally and update their models. Using HE in these scenario does not produce any accuracy loss because no noise will be added to the model parameters during the encryption and decryption process.

Thresholded Paillier. In the thresholded Paillier scheme, the secret key is divided to multiple shares, and each share is given to a different client. Now each client can partially decrypt an encrypted message, but if less than a threshold, say t, combine their partial decrypted values, they cannot get any information about the real message. On the other hand, if combining $\geq t$ partial decrypted values, the secrete can be recovered. In this system, the computations are in group $\mathbb{Z}_{n^2}$, where n is an RSA modulus. The process is as follows.

Key generation: First, find two primes p and q that satisfies p=2p'+1 and q=2q'+1 where p'q' are also prime. Now set the n=pq and m=p'q'. Pick d such that d=0 mod m and d=1 mod $n^2$. Now the key server creates a polynomial $f(x) = \sum_{i=0}^{k-1} a_i x^i$ mod $n^2 m$ where $a_i$ are chosen randomly from $\mathbb{Z}_{n*^2 m}$ and the secret is hidden at $a_0=d$. Now each secret key share is calculated as $s_i = f(i)$ for l shareholders and the public key is n. For verification of correctness of decryption another public value v is also generated where the verification key for each shareholder is $v_i = v^{2\Delta s_i}$ mod $n^2$ and $\Delta = l$.

Encryption: For message M, a random number r is chosen from $\mathbb{Z}*_{n^2}$ and the output ciphertext is $c = g^M \cdot r^{n^2}$ mod $n^2$.

Share decryption: The $i^{th}$ shareholder computes $c_i = c^{2\Delta s_i}$ for ciphertext c. And for zero-knowledge proof, it provides $\log_{c^4}(c_i^2) = \log_v(v_i)$ which provides guarantee that the shareholder really uses its secret share for decryption $s_i$.

Share combining: After collecting k partial decryption, the server can combine them into the original plain-text message M by $c' = \prod_{i \in \|k\|} c_i^{2\lambda_{0,i}^s}$ mod $n^2$ where $$\lambda_{0,i}^S = \prod_{i' \in [k], i' \neq i} \frac{-i}{i - i'}.$$

And use it to generate the M.

Utilizing recursion in cPIR. A solution to reduce the number encryptions and upload bandwidth at the clients would be using recursion in cPIR. In this technique, the dataset is represented by a $k_3$-dimensional hypercube, and this allows the PIR client to prepare and send $$k_3 \sqrt[k_3]{k_1 d}.$$

encrypted values where $k_3$ would be another hyperparameter. This technique can be used to reduce the number of encryptions which makes the upload bandwidth consumption lower too. For instance, if there were one shuffling pattern $k_2=1$, the number of encryption decreases from $k_1 d$ to $$k_3 \sqrt[k_3]{k_1 d}.$$

Plugging newer PIR protocol. Parameter permutation for federated learning techniques may utilize cPIR for private aggregation, in some embodiments. However, any other cPIR protocol can be used in parameter permutation for federated learning. For example, SealPIR can be used to reduce the number of encryptions at the client. SealPIR is based on a SEAL which is a lattice based fully HE.

In various embodiments, these techniques may be combined with an external client shuffler for more privacy amplification. For further privacy amplification, an external shuffler that shuffles the n sampled clients' updates similar to FLAME can be used. Double amplification by first shuffling the parameters at the clients (e.g., detaching the parameter values from their position) and then shuffle the client's updates at the external shuffler (e.g., detaching the updates from their client's ID).

The specification next discusses example implementations of a federated machine learning system that can implement the above parameter permutation techniques for federated learning. Then, various exemplary flowcharts illustrating methods and techniques, which may be implemented by these machine learning systems or other systems or applications are discussed. Finally, an example computing system is discussed upon which various embodiments may be implemented is discussed.

Figure 6:
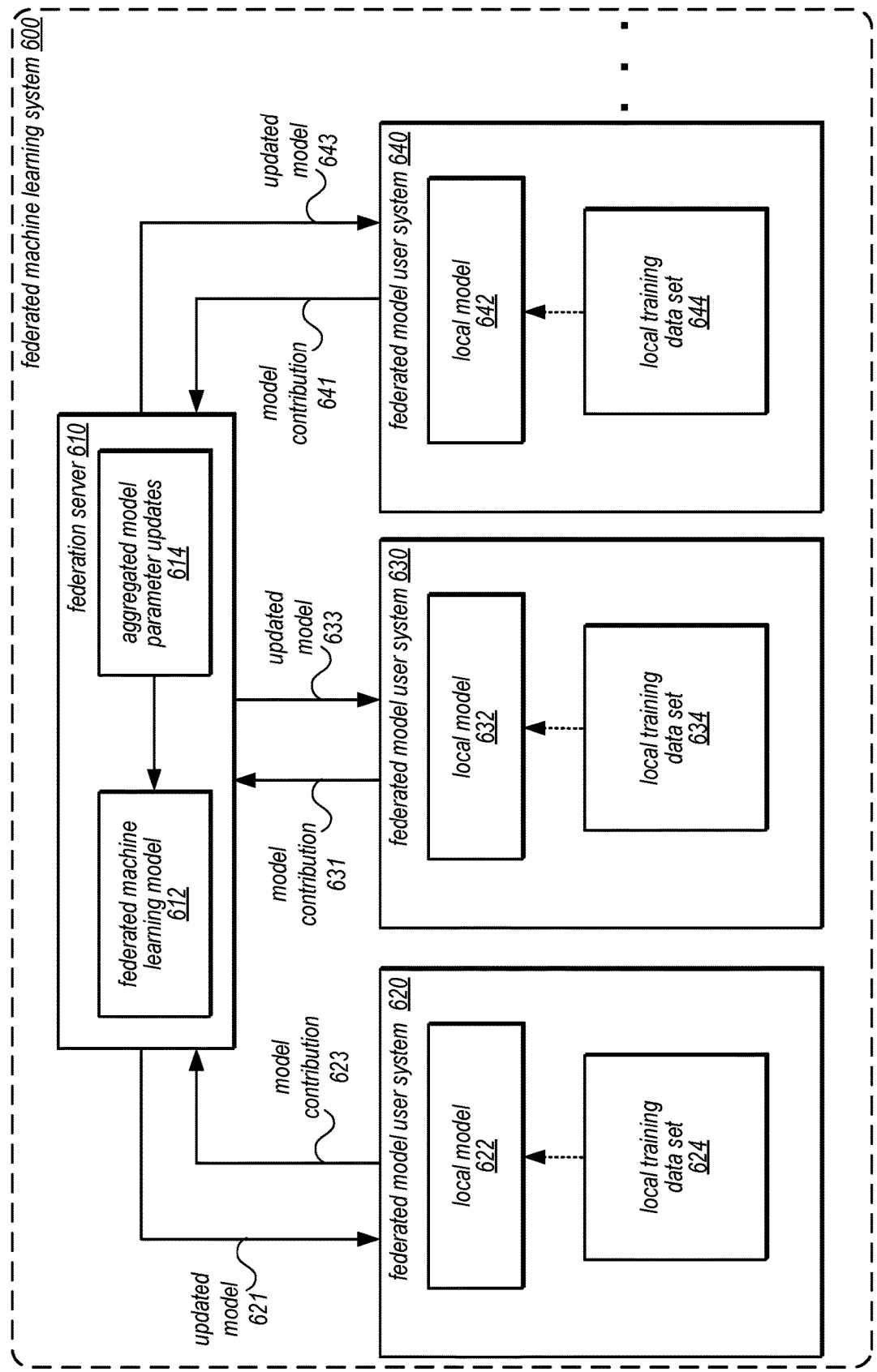
FIG. 6 is a logical block diagram illustrating a federated machine learning system that implements by parameter permutation, according to some embodiments.

FIG. 6 is a logical block diagram illustrating a federated machine learning system that implements by parameter permutation, according to some embodiments, according to some embodiments, which may implement the various techniques discussed above with regard to FIGS. 1-5B and below with regard to FIGS. 7-8. A federated machine learning system 600 may include a central aggregation server, such as federated server 610, which may implement the various techniques ascribed to the "server," "federation server," "aggregation server," and "aggregator" discussed above, and client systems, such as multiple federation model user systems 620, 630, and 640, that may employ local machine learning systems, in various embodiments, and implement the various techniques ascribed to "clients" discussed above. The respective federation server 610 and federated model user systems 620, 630 and 640 may be implemented, for example, by computer systems 1000 (or other electronic devices) as shown below in FIG. 9. The federation server 610 may maintain a federated machine learning model 612 and, to perform training, may distribute a current version of the machine learning model 612 to the federated model user systems 620, 630, and 640 (as indicated by respective updated models 621, 633, and 643). For example, as discussed above, federation server 610 may send the parameters of an updated model to federated model user systems after responsive to cPIR queries.

After receiving a current version of the machine learning model 612, individual ones of the federated model user systems 620, 630 and 640, may independently generate locally updated versions of the machine learning models 622, 632, and 642 by training the model using local, training data sets 624, 634, and 644. Individual ones of the federated model user systems 620, 630, and 640 may independently alter, by clipping and applying noise, to their local model parameter updates to generate modified model parameter updates, where the altering provides or ensures privacy of their local training data sets 624, 634, and 644, in some embodiments. Intra-model parameter shuffling may also be performed, as discussed above.

Upon receipt of the collective modified model parameter updates, the federation server 610 may then aggregate the respective modified model parameter updates to generate aggregated model parameter updates 614. For example, as discussed above and below with regard to FIG. 5, averaging of parameter updates may be performed to determine the aggregated model parameter updates. The federation server 610 may then apply the aggregated model parameter updates 614 to the current version of the federated machine learning model 612 to generate a new version of the model 612. This process may be repeated a number of times until the model 612 converges or until a predetermined threshold number of iterations is met.

Various different systems, services, or applications may implement the techniques discussed above. For example, FIG. 9, discussed below, provides an example computing system that may implement various ones of the techniques discussed above. FIG. 4 is a high-level flowchart illustrating techniques to hierarchical gradient averaging for enforcing subject-level privacy for training machine learning models, according to some embodiments. These techniques may be implemented on systems similar to those discussed above with regard to FIG. 9 as well as other machine learning systems, services, or platforms, or those that incorporate machine learning techniques.

Figure 7:
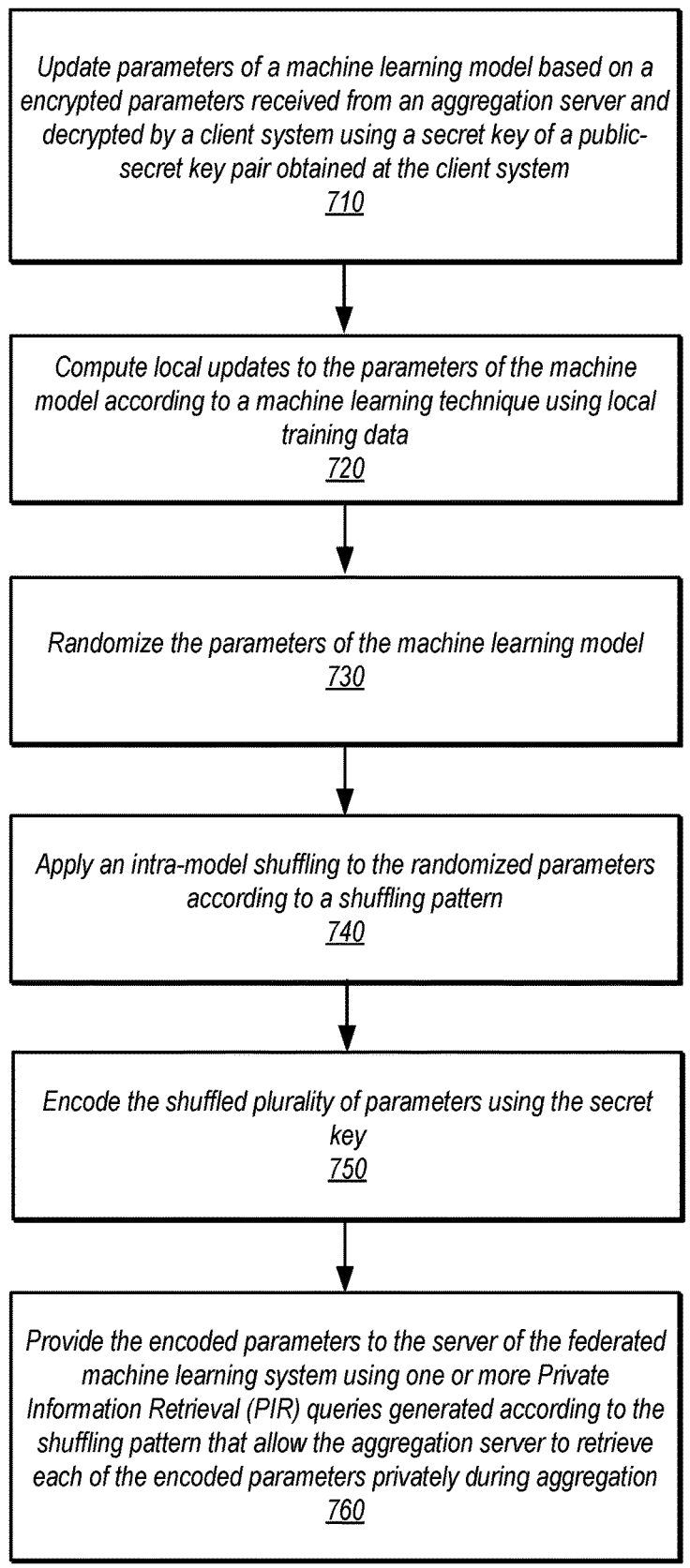
FIG. 7 is a high-level flowchart illustrating techniques to implement federated learning by parameter permutation at a client, according to some embodiments.

FIG. 7 is a high-level flowchart illustrating techniques to implement federated learning by parameter permutation at a client, according to some embodiments. Various different embodiments of techniques for parameter permutation are discussed above with regard to FIGS. 1-6, such as with regard to Algorithm 1 in FIG. 4, FIG. 1D, and FIGS. 5A-5B. The following method may be used to implement the techniques discussed above. As indicated at 710, parameters of a machine learning model may be updated based on a encrypted parameters received from an aggregation server and decrypted by the client system using a secret key of a public-secret key pair obtained at a client system, in some embodiments. For example, as discussed above, a public-secret key pair can be obtained from a key server or from a leader client (e.g., designated or selected by an aggregation server). The public-secret key pair may be a form of HE, including partial HE, such as the Paillier techniques discussed above. For example, in some embodiments, the secret key may be the whole secret key or share of a divided secret key.

As indicated at 720, local updates to the parameters of the machine model according to a machine learning technique may be applied using local training data, in some embodiments. For example, a stochastic gradient learning technique may be applied in some embodiments. Other machine learning techniques can be used in other embodiments.

As indicated at 730, parameters of the machine learning model may be randomized, in some embodiments. For example, a Laplace mechanism, as discussed above, may be used to ensure that the noise added by randomization fits within a privacy budget.

As indicated at 740, intra-model shuffling may be applied to the randomized parameters according to a shuffling pattern. For example, as discussed above with regard to FIGS. 2 and 3, one (or multiple) shuffling patterns may be randomly selected each training round. The parameters of model may be divided into equally-sized windows, the size of which may be specified as a hyperparameter for federated learning, according to some embodiments.

As indicated at 750, the shuffled parameters using may be encoded using the secret key, in some embodiment. As indicated at 760, the encoded parameters may be provided to the aggregation server using one or more Private Information Retrieval (PIR) queries generated according to the shuffling pattern that allow the aggregation server to retrieve each of the encoded local parameter privately during aggregation. Different PIR techniques may be used, such as cPIR or sealPIR, as discussed above.

Figure 8:
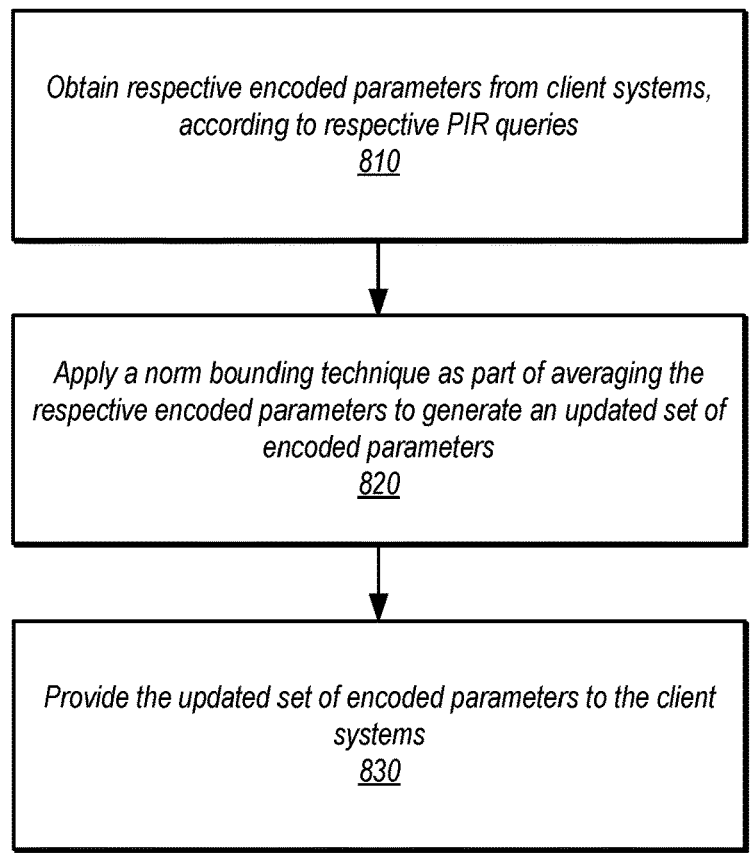
FIG. 8 is a high-level flowchart illustrating techniques to implement federated learning by parameter permutation at an aggregation server, according to some embodiments.

FIG. 8 is a high-level flowchart illustrating techniques to implement federated learning by parameter permutation at an aggregation server, according to some embodiments. As indicated at 810, respective encoded parameters may be obtained from a plurality of client systems according to respective PIR queries, in some embodiments. For example, the aggregation server may use binary masks generated for cPIR queries to obtain the encoded parameters.

As indicated at 820, a norm bounding technique as part of averaging the respective encoded parameters to generate an updated set of encoded parameters, in some embodiments. For example, as discussed above the $\ell_2$-norm of the respective encoded parameters as a whole irrespective of their order. As indicated at 830, the updated set of encoded parameters may be provided to the client systems.

Figure 9:
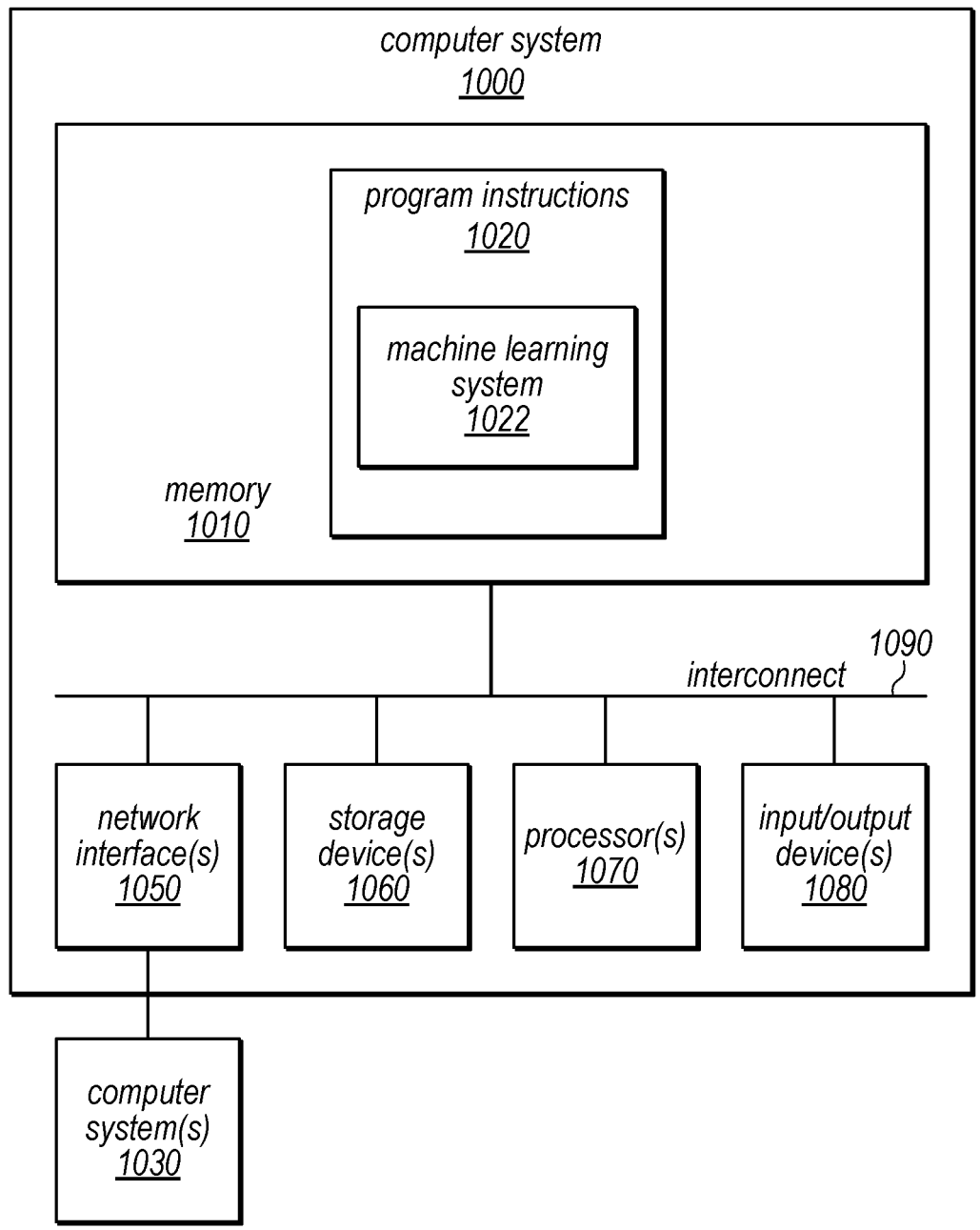
FIG. 9 illustrates an example computing system, according to some embodiments.

FIG. 9 illustrates a computing system configured to implement the methods and techniques described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing federated learning by parameter permutation, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. Each of the processors 1070 may include a hierarchy of caches, in various embodiments. The computer system 1000 may also include one or more persistent storage devices 1060 (e.g. optical storage, magnetic storage, hard drive, tape drive, solid state memory, etc.) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 9 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement various features described above, including a machine learning system 1022 as discussed above with regard to FIGS. 1-105 that may perform the various techniques of federated learning by parameter permutation, in some embodiments as described herein. Program instructions 1020 may be encoded in platform native binary, any interpreted language such as Java™ byte-code, or in any other language such as C/C++, Java™, etc. or in any combination thereof.

In one embodiment, Interconnect 1090 may be configured to coordinate I/O traffic between processors 1070, storage devices 1070, and any peripheral devices in the device, including network interfaces 1050 or other peripheral interfaces, such as input/output devices 1080. In some embodiments, Interconnect 1090 may perform any necessary protocol, timing or other data transformations to convert data signals from one component (e.g., system memory 1010) into a format suitable for use by another component (e.g., processor 1070). In some embodiments, Interconnect 1090 may include support for devices attached through various types of peripheral buses, such as a variant of the Peripheral Component Interconnect (PCI) bus standard or the Universal Serial Bus (USB) standard, for example. In some embodiments, the function of Interconnect 1090 may be split into two or more separate components, such as a north bridge and a south bridge, for example. In addition, in some embodiments some or all of the functionality of Interconnect 1090, such as an interface to system memory 1010, may be incorporated directly into processor 1070.

Network interface 1050 may be configured to allow data to be exchanged between computer system 1000 and other devices attached to a network, such as other computer systems, or between nodes of computer system 1000. In various embodiments, network interface 1050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1080 may, in some embodiments, include one or more display terminals, keyboards, keypads, touchpads, scanning devices, voice or optical recognition devices, or any other devices suitable for entering or retrieving data by one or more computer system 1000. Multiple input/output devices 1080 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1050.

Those skilled in the art will appreciate that computer system 1000 is merely illustrative and is not intended to limit the scope of the methods for providing enhanced accountability and trust in distributed ledgers as described herein. In particular, the computer system and devices may include any combination of hardware or software that may perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:
1. A system, comprising:
   at least one processor;
   a memory, comprising program instructions that when executed by the at least one processor cause the at least one processor to implement a client system of a federated machine learning system, configured to:
for one or more training rounds to train a machine learning model according to a federated learning technique:
update a plurality of parameters of the machine learning model based on a plurality of encrypted parameters received from an aggregation server of the federated machine learning system and decrypted by the client system using a secret key of a public-secret key pair obtained at the client system;
compute local updates to the plurality of parameters of the machine model according to a machine learning technique using local training data;
randomize the plurality of parameters of the machine learning model;
apply an intra-model shuffling to the randomized plurality of parameters according to a shuffling pattern;
encode the shuffled plurality of parameters using the secret key; and
provide the encoded plurality of parameters to the server of the federated machine learning system using one or more Private Information Retrieval (PIR) queries generated according to the shuffling pattern that allow the server to retrieve each of the encoded local parameter privately during aggregation.

2. The system of claim 1, wherein the shuffling pattern is a first shuffling pattern, wherein a second shuffling pattern is applied to further parameters of the machine learning model that are encoded and provided to the server according to one or more further PIR queries generated according to the second shuffling pattern.

3. The system of claim 1, wherein the secret key is a share of the secret key determined according to a thresholded Paillier scheme, wherein different other shares of the secret key are provided to different client systems of the server.

4. The system of claim 1, wherein for individual ones of the one or more training rounds, the client system randomly selects the shuffling pattern.

5. The system of claim 1, wherein the shuffling pattern is applied to equally-sized windows of parameters of the plurality of parameters, and wherein a respective size of the equally sized windows is specified as a hyperparameter for the federated technique.

6. The system of claim 1, wherein the public-secret key pair is obtained from a key server.

7. The system of claim 1, further comprising:
a further processor; and
a further memory, storing further program instructions that when executed by the further processor, cause the further processor to implement the server, wherein the server is configured to:
obtain respective pluralities of encoded parameters from a plurality of client systems, including the client system, according to respective PIR queries;
apply a norm bounding technique as part of averaging the respective pluralities of encoded parameters to generate an updated set of encoded parameters; and
provide the updated set of encoded parameters to the plurality of client systems.

8. A method, comprising:
for one or more training rounds to train a machine learning model according to a federated learning technique:
updating, by a client system of an aggregation server, a plurality of parameters of a machine learning model based on a plurality of encrypted parameters received from the aggregation server and decrypted by the client system using a secret key of a public-secret key pair obtained at the client system;
computing, by the client system, local updates to the plurality of parameters of the machine model according to a machine learning technique using local training data;
randomizing, by the client system, the plurality of parameters;
applying, by the client system, an intra-model shuffling to the randomized plurality of parameters according to a shuffling pattern;
encoding, by the client system, the shuffled plurality of parameters using the secret key; and
providing, by the client system, the encoded plurality of parameters to the aggregation server using one or more Private Information Retrieval (PIR) queries generated according to the shuffling pattern that allow the aggregation server to retrieve each of the encoded local parameter privately during aggregation.

9. The method of claim 8, wherein the shuffling pattern is a first shuffling pattern, wherein a second shuffling pattern is applied to further parameters of the machine learning model that are encoded and provided to the server according to one or more further PIR queries generated according to the second shuffling pattern.

10. The method of claim 8, wherein the secret key is a share of the secret key determined according to a thresholded Paillier scheme, wherein different other shares of the secret key are provided to different client systems of the server.

11. The method of claim 8, wherein for individual ones of the one or more training rounds, the client system randomly selects the shuffling pattern.

12. The method of claim 8, wherein the shuffling pattern is applied to equally-sized windows of parameters of the plurality of parameters, and wherein a respective size of the equally sized windows is specified as a hyperparameter for the federated technique.

13. The method of claim 8, wherein the public-secret key pair is obtained from another client system of the aggregation server.

14. The method of claim 8, further comprising:
obtaining, at the aggregation server, respective pluralities of encoded parameters from a plurality of client systems, including the client system, according to respective PIR queries;
applying, by the aggregation server, a norm bounding technique as part of averaging the respective pluralities of encoded parameters to generate an updated set of encoded parameters; and
providing, by the aggregation server, the updated set of encoded parameters to the plurality of client systems.

15. One or more non-transitory, computer-readable storage media, storing program instructions that when executed on or across one or more computing devices, cause the one or more computing devices to implement a client system of an aggregation server:
for one or more training rounds to train a machine learning model according to a federated learning technique:
updating a plurality of parameters of a machine learning model based on a plurality of encrypted parameters received from the aggregation server and decrypted by the client system using a secret key of a public-secret key pair obtained at the client system;

computing local updates to the plurality of parameters of the machine model according to a machine learning technique using local training data;

randomizing the plurality of parameters of the machine learning model;

applying an intra-model shuffling to the randomized plurality of parameters according to a shuffling pattern;

encoding the shuffled plurality of parameters using the secret key; and providing the encoded plurality of parameters to the aggregation server using one or more Private Information Retrieval (PIR) queries generated according to the shuffling pattern that allow the aggregation server to retrieve each of the encoded local parameter privately during aggregation.

16. The one or more non-transitory, computer-readable storage media of claim 15, wherein the shuffling pattern is a first shuffling pattern, wherein a second shuffling pattern is applied to further parameters of the machine learning model that are encoded and provided to the server according to one or more further PIR queries generated according to the second shuffling pattern.

17. The one or more non-transitory, computer-readable storage media of claim 15, wherein the secret key is a share of the secret key determined according to a thresholded Paillier scheme, wherein different other shares of the secret key are provided to different client systems of the server.

18. The one or more non-transitory, computer-readable storage media of claim 15, wherein for individual ones of the one or more training rounds, the client system randomly selects the shuffling pattern.

19. The one or more non-transitory, computer-readable storage media of claim 15, wherein the shuffling pattern is applied to equally-sized windows of parameters of the plurality of parameters, and wherein a respective size of the equally sized windows is specified as a hyperparameter for the federated technique.

20. The one or more non-transitory, computer-readable storage media of claim 15, wherein the public-secret key pair is provided by the client system to other client systems of the aggregation server according to a determination that the client system is a leader client.

* * * * *